United States Patent [19]

Takanashi et al.

[11] Patent Number: 5,006,935
[45] Date of Patent: Apr. 9, 1991

[54] CHARGE LATENT IMAGE RECORDING REPRODUCING SYSTEM WITH A UNIFORMLY CHARGE DETECTION REGION PROVIDING A REFERENCE INTENSITY OF A RECORDED OBJECT

[75] Inventors: Itsuo Takanashi, Kamakura; Shintaro Nakagaki, Fujisawa; Hirohiko Shinonaga, Yokohama, all of Japan

[73] Assignee: Victor Company of Japan, Ltd., Yokohama, Japan

[21] Appl. No.: 412,310

[22] Filed: Sep. 26, 1989

[30] Foreign Application Priority Data

| Sep. 26, 1988 | [JP] | Japan | 63-240294 |
| Mar. 24, 1989 | [JP] | Japan | 63-72162 |
| Mar. 24, 1989 | [JP] | Japan | 63-72635 |
| Mar. 24, 1989 | [JP] | Japan | 63-72636 |

[51] Int. Cl.$^5$ ............................................. H04N 1/29
[52] U.S. Cl. ............................... 358/300; 358/310; 358/335; 346/160
[58] Field of Search ............ 358/300, 209, 231, 310, 358/335, 471; 346/153.1, 160; 365/112

[56] References Cited

U.S. PATENT DOCUMENTS 4,945,423 7/1990 Takanashi ............................. 358/300
4,956,714 9/1990 Takanashi ......................... 358/213.11

OTHER PUBLICATIONS

Image Electronic Circuit, pp. 70–77 (w/Partial Translation).

Primary Examiner—George H. Miller, Jr.
Assistant Examiner—Scott A. Roger
Attorney, Agent, or Firm—Fleit, Jacobson, Cohn, Price, Holman & Stern

[57] ABSTRACT

There is disclosed a recording/reproducing system comprising an optical system for directing along a path of an electromagnetic radio ray from an object toward a recording medium, and a recording head disposed in the path for generating a charge latent image onto the medium. The feature of the system resides in that the recording head (system) forms the detection region which is not entirely subject to the influence of the electromagnetic radio ray and which is provided in a portion of the charge recording region of the medium, and in that a reproducing system discriminates the polarity of charges or the recording mode of the charge latent image recorded onto the medium by detecting the charges in the dectection region.

12 Claims, 11 Drawing Sheets

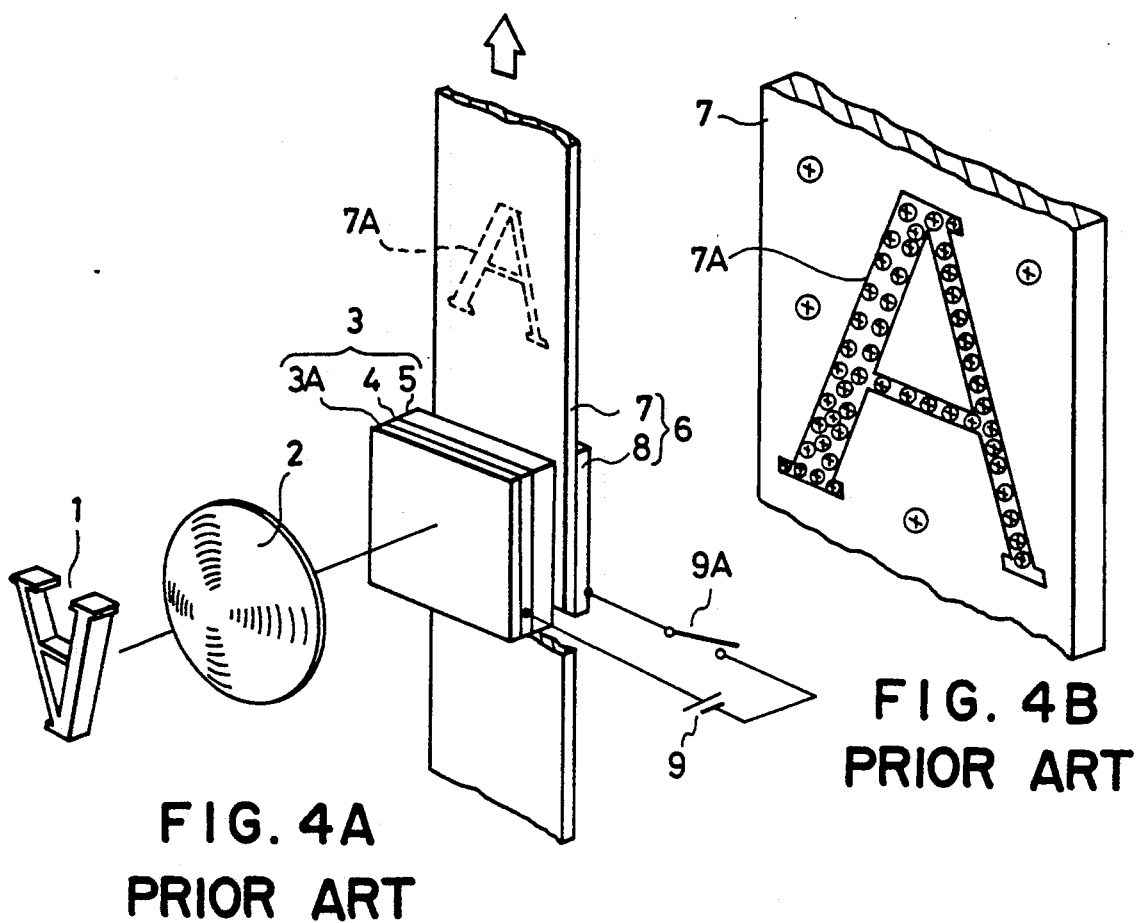
FIG. 4A PRIOR ART
FIG. 4B PRIOR ART
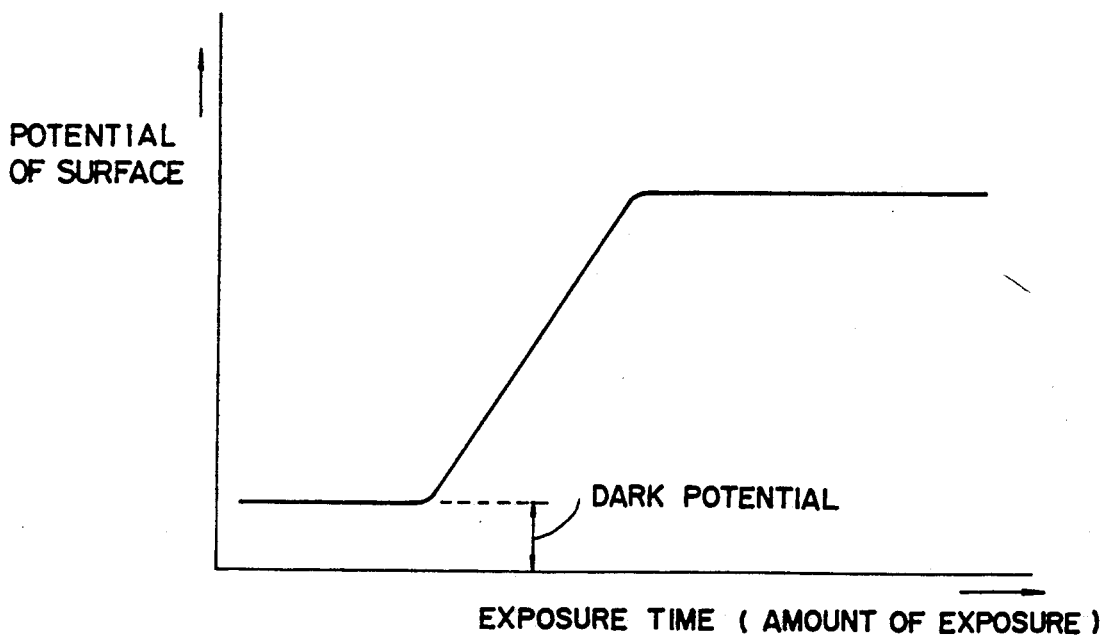
FIG. 4C PRIOR ART

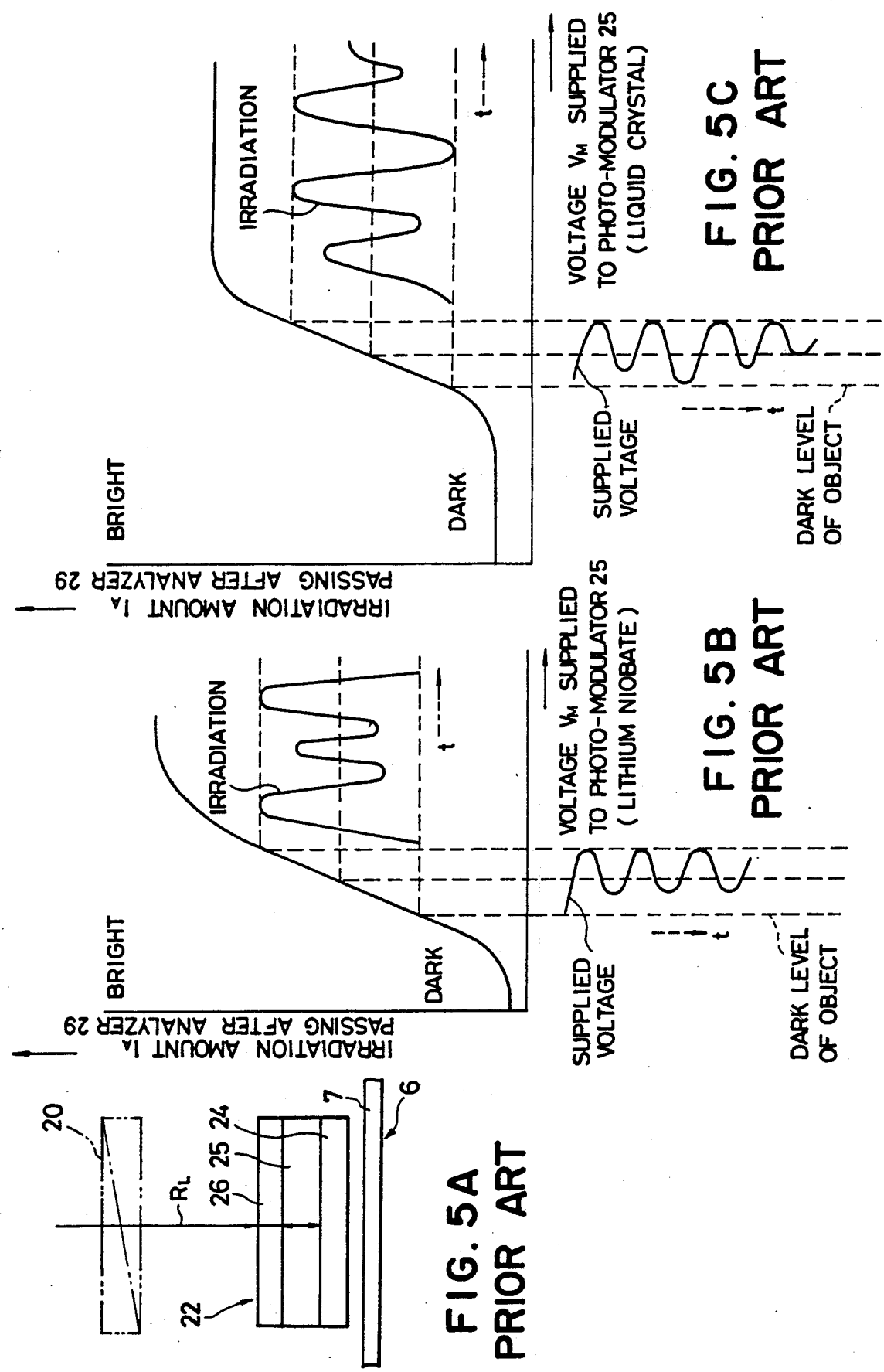

| LEVEL OF READ-OUT VOLTAGE $V_C$ | CLASSIFIED VALUES OF $V_C$ | RECORDING MODE |
|---|---|---|
| $V_C < -V_t$ | 0 (FIG. 9(d)) | NEGATIVE CHARGE NEGATIVE LATENT IMAGE |
| $-V_t < V_C < 0$ | 1 (FIG. 9(b)) | NEGATIVE CHARGE POSITIVE LATENT IMAGE |
| $0 < V_C < V_t$ | 2 (FIG. 9(a)) | POSITIVE CHARGE POSITIVE LATENT IMAGE |
| $V_t < V_C$ | 3 (FIG. 9(c)) | POSITIVE CHARGE NEGATIVE LATENT IMAGE |

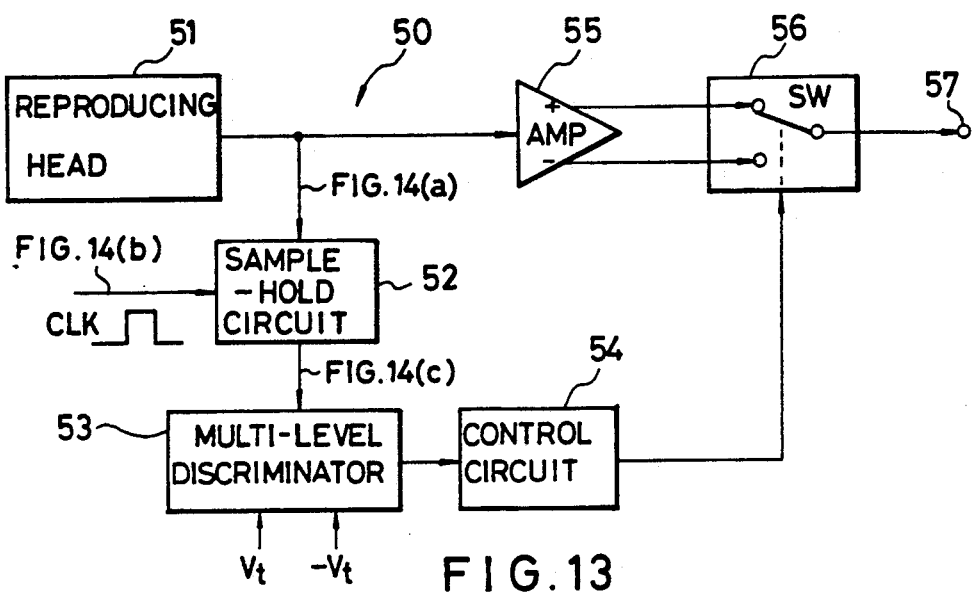
FIG. 13
FIG. 14A
FIG. 14B
FIG. 14C
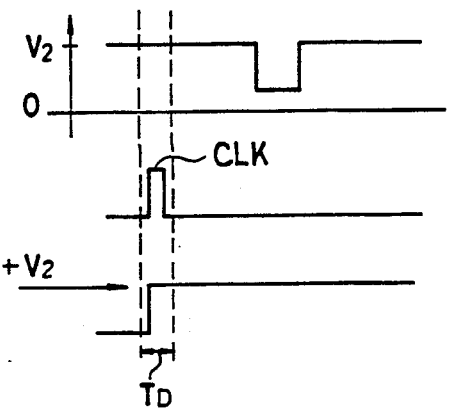
FIG. 15
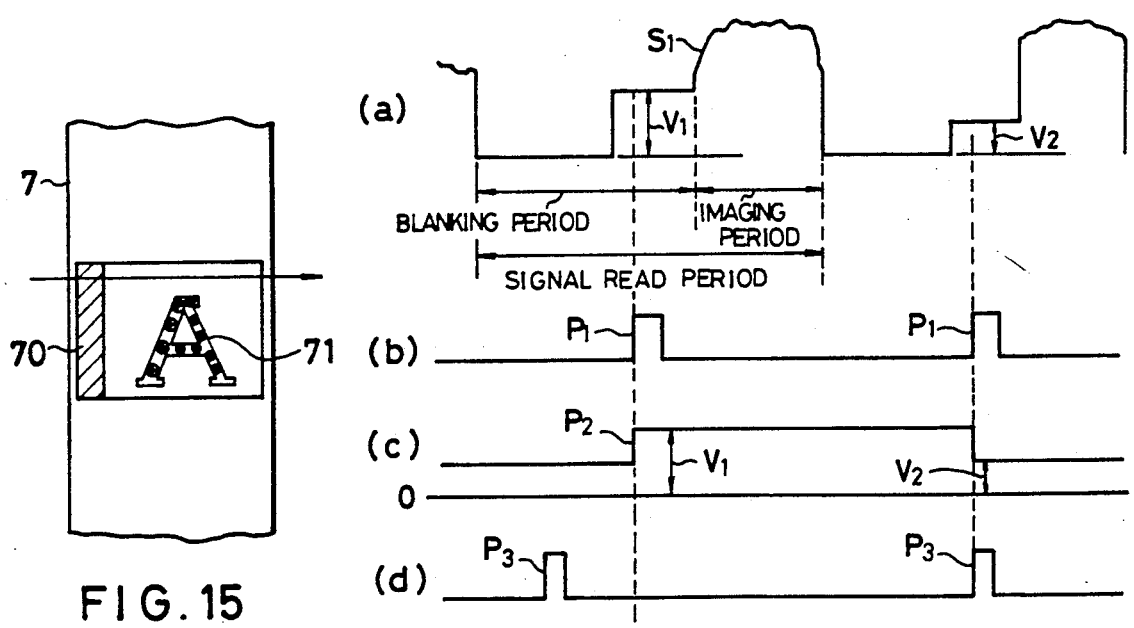
FIG. 16

CHARGE LATENT IMAGE RECORDING REPRODUCING SYSTEM WITH A UNIFORMLY CHARGE DETECTION REGION PROVIDING A REFERENCE INTENSITY OF A RECORDED OBJECT

BACKGROUND OF THE INVENTION

This invention relates to a system for recording/reproducing a charge latent image, and more particularly to a recording/reproducing system adapted to apply photoelectric transformation or conversion to an optical image of an object obtained through an optical lens, thus permitting a charge latent image thus obtained to be recorded with a high resolution, and to retransform a pictorial image information which has been signal conversion and recorded on a medium, thus permitting it to be reproduced as a high resolution charge latent image.

Generally, a latent image means (a) an input image before transformation into a visual image by applying an exposure energy or other energies to a photographic plate in the field of the photographic technology, or means (b) an image stored in the form of charges on a surface consisting of small capacitors collected in the form of mosaic in the field of the electric technology. This invention is applied to an image pickup apparatus for a still picture or a moving picture for electrically recording a latent image in the case of (b). This image pickup apparatus is constructed to apply photoelectric transformation to optical information obtained by forming an image of an object through an optical system, thus to provide electric signal information. The feature of a video signal thus obtained is that recording, reproducing, erasing, editing and trimming are easy. Therefore, apparatus for recording/reproducing a charge latent image are widely used not only in the field of the broadcasting technology but also in other many technical fields such as printing, electronic publishing and measurement.

Accordingly, it is desired to provide an image pickup device capable of recording an image of an object as a charge latent image having fineness and high resolution, and/or reproducing a pictorial image from signal information related to such a recorded latent image.

Meanwhile, a charge latent image on medium includes four recording modes (a) to (d) as will be mentioned later by combination of the following principles (i) and (ii);

(i) a polarity of charges is positive or negative; and (ii) a light and shade of an optical image is directly proportional to a charge amount (this case will be called as "a positive latent image") or a light and shade of an optical image is inversely proportional to a charge amount (this case will be called as "a negative latent image").

The four recording modes are as follows:

(a) A positive charge positive latent image in which other portions are formed by positive charges;

(b) A negative charge positive latent image in which other portions are formed by negative charges;

(c) A positive charge negative latent image in which other portions are formed by positive charges; and (d) A negative charge positive latent image in which other portions are formed by negative charges.

Conventional recording systems for recording a latent image in the above-mentioned modes are shown in FIGS. 1 to 3. FIGS. 1 to 3 correspond to the above recording modes (a) to (d), respectively. In respective figures, reference numeral 1 denotes an image pickup object, reference numeral 2 a lens constituting an optical system, reference numeral 3 a recording head comprising a transparent electrode 4 and a photoconductive layer member 5, reference numeral 6 a recording medium comprising a charge hold layer member 7 and a medium side electrode 8, and reference numeral 9 a power supply connected between the above-mentioned electrodes 4 and 8. In the case of the arrangement shown in FIGS. 1 and 1A, the connection polarities of the power supply 9 are opposite to each other. Furthermore, the arrangement shown in FIGS. 2 and 3 includes a corona charger 10 for applying negative or positive charges to the charge hold layer member 7 wherein the charger 10 includes a power supply 11 for a charger depending upon respective polarities.

The operational principle for recording an optical image on the basis of respective recording modes shown in FIGS. 1 to 3 will now be described.

In the recording system shown in FIG. 1, the positive electrode of the power supply 9 is connected to the transparent electrode 4 of the recording head 3 and the negative electrode of the power supply 9 is connected to the electrode 8. Accordingly, where an optical image of the object 1 is formed on the photoconductive layer member 5 of the head 3, an electric resistance value of the member 5 appears in correspondence with the object 1. A very small gap exists between the photoconductive layer member 5 and the charge hold layer member 7. An air discharge is generated in this gap. Accordingly, an image of the object 1 based on the positive charge positive latent image is formed on the surface of the hold layer 7.

In the recording system of a structure shown in FIG. 1A, the connection polarity of the power supply 9 is opposite to that of FIG. 1. Therefore, an image of the object 1 is formed by the negative charge positive latent image.

In the recording system of a structure shown in FIG. 2, corona charger 10 of the negative polarity charges in advance hold layer 7 of medium 6 so that it has a negative polarity. Since positive charges are rendered to the surface of the hold layer 7 in correspondence with the shape of the object 1, portions having weak negative charges appear as a negative charge negative latent image in correspondence with the image as shown.

In the recording system of a structure shown in FIG. 3, the corona charger 10 charges in advance the hold layer 7 so that it has a positive polarity Since a portion corresponding to an image of the object 1 formed on the photoconductive layer 5 through the lens 2 is charged negative by a negative air discharge, weak positive charge portions appear on the surface of the hold layer 7 as a positive charge negative latent image in correspondence with the image as shown.

An actual example particularly in the case of recording an optical image as a charge latent image on the basis of the aforementioned basic principle, is shown in FIGS. 4A to 4C. This recording system is directed to the system for recording an object with high resolution and high fineness.

In FIG. 4A, reference numerals 1 to 9 show components equivalent to or corresponding to the components of the recording system explained with reference to FIGS. 1 to 3, respectively. Reference numeral 3A denotes a glass plate (GP) attached on the object side of the recording head 3, and reference numeral 9A denotes a switch which is turned on to generate a predetermined electric field across the both electrodes 4 and 8 by the power supply 9 and is turned off to interrupt such a generation. To prevent an unnecessary external light from being incident to the photoconductive layer member 5, these components are accommodated within a black box of a suitable structure. The transparent electrode 4 constituting the head 3 consists of a material, e.g., Indium-Tin Oxide (ITO), having a spectral transmission characteristic permitting a light in a wavelength band suitable for formation of an image of an object of optical information incident thereto to be transmitted therethrough. The photoconductive layer member 5 consists of a material, such as amorphous silicon having a characteristic such that when a highly fine optical image is formed on the surface of the object side under the condition where an electric field having a suitable strength is formed across both electrodes 4 and 8, a high precision charge latent image can be formed on the other surface.

The charge hold layer member 7 consists of a material such as a silicon resin, having a high insulating resistance value so that a latent image formed by charges produced on the surface can be held without being changed for a long time. This member 7 may be in an arbitrary form, e.g., disk, tape, or sheet, etc., and is caused to run in a direction indicated by an arrow in blank by a predetermined transferring method irrespective of its shape.

The operation as to how the conventional system constructed above records a charge latent image will now be described with reference to FIGS. 4A to 4C.

A light from the object 1 is passed through the lens 2, whereby an image thereof is formed on the recording head 3. The light which has reached the object 1 side of the head 3 is passed through the glass plate 3A and the transparent electrode 4, and is then incident to the photoconductive layer 5. Since the photoconductive layer 5 exhibits an electric resistance value corresponding to a received light quantity at this time, a resistance value of a portion corresponding to the shape of the object 1 (capital letter A in the figure) and those of other portions will differ from each other. Thus, a partial unevenness of resistance value provides an original form of a latent image. Since the photoconductive layer 5 is supplied with a predetermined voltage through the power supply 9 and the switch 9A, an unevenness per each portion of the resistance value results in an unevenness of an amount of charges on the hold layer 7 provided facing to the photoconductive layer 5 between electrodes 4 and 8. As a result, a charge latent image 7A is formed on the hold layer 7 as shown in FIG. 4B. The charge latent image 7A shown in FIG. 4B is a positive charge positive latent image wherein an amount of positive charges of the image corresponding portion (i.e., capital letter A) is larger than that of the background portion.

FIG. 4C is a characteristic diagram showing the correlation between an amount of exposure received by the recording head 3 and a surface potential of the hold layer 7. The correlation therebetween appears as an increase in the surface potential when an amount of exposure of the photoconductive layer 5 calculated by "surface illuminance × irradiation time" is increased by the image pickup of the object 1. In this figure, a voltage not relevant to the amount of exposure appears on the surface potential of the hold layer 7. Since this voltage is such a voltage to make exposure excessive as compared to the case of a voltage corresponding to an actual amount of exposure, it is called a "dark voltage".

In order to reproduce the charge latent image recorded in the aforementioned manner, it is possible to directly read out charges as electric signals by a charge detector. Furthermore, it is possible to read out the charge image in the manner that charges are supplied to a photo-modulation element comprised of materials having an electro-optical effect and outputting a modulated readout light on the basis of a received readout light, and a photo-diode converts the modulated readout light into electric signals. These reproduction methods are disclosed in European Patent Application (EPA) No. 89306243.0 in the case of using the charge detecter, and EPA No. 87311531.5 in the case of using the photo-modulation element.

Referring to FIGS. 5A to 5E, an example using the photo-modulation element will be simply described.

There are two types of the reproduction methods using the photo-modulation element, one of which is a light transmission type shown in FIG. 5D, and the other is a light reflection type shown in FIG. 5E. In both cases, a photo-electric conversion element such as a photo-diode reads out a modulated readout light I corresponding to an electric charge latent image as electric signals. In order to obtain a time axis signal such as a television (TV) signal from the two-dimensional recording surface as aforementioned, there is used a system of a combination of a linear sensor and sub-scanning or a two-dimensional scanning for the readout light. As these systems are described in the aforementioned applications in detail, an explanation will be described on condition that the electric signals are obtained by using any system for the scanning thereof.

The system of the light transmission type shown in FIG. 5D comprises a polarizer 20 for transmitting a laser beam $R_L$ therethrough, a reproducing head (readout element) 22 for receiving a transmitted light and reproducing a latent image from charges on the hold layer 7 by an electric field 23 generated across the reproducing head 22 and the charge hold layer 7 of the medium 6 to provide a reconstructed picture, and an analyzer 29 for providing a reconstructed image on the basis of an output light corresponding to the latent image in accordance with the charge distribution of the hold layer 7. On the other hand, the system of the reflection type shown in FIG. 5E is such that components equivalent to or corresponding to those designated by the same reference numerals in FIG. 5D are arranged as shown, respectively, characterized in that there is provided a beam splitter 21 for transmitting a laser beam through the portion between the polarizer 20 and the reproducing head 22 and for reflecting a light ray from the head 22 to change the direction thereof toward the analyzer 29 side.

In the systems of the both types, the arrangement of the reproducing head 22 for emitting a light beam having an intensity distribution in conformity with a charge latent image by an occurring electric field 23 by recorded charges is shown in FIG. 5A. As shown in this figure, the reproducing head 22 as a charge readout element comprises a dielectric mirror 24 facing to the hold layer 7, a photomodulation layer 25 consisting of, e.g., lithium niobate single crystal, attached on the opposite surface of the dielectric mirror 24, and a transparent electrode 26 provided on the opposite surface of the photomodulation layer 25. As long as the photomodulation layer 25 has an electrooptical effect which is the characteristic capable of changing the state of light by an applied voltage, it may consist of any material except for the above-mentioned lithium niobate single crystal.

The operation for reproducing an image from the hold layer 7 of the medium 6 on which a charge latent image is recorded will now be described with reference to FIGS. 5A to 5C.

As shown in FIG. 5A, a laser beam $R_L$ which has been passed through the polarizer 20 is incident to the reproducing head 22. Then, it is transmitted through the transparent electrode 26 to reach the modulation layer 25, at which it is reflected by the inductor mirror 24 attached to the other surface of the modulation layer 25. At this time, an electric field is produced, by a medium electrode (not shown), across the reproducing head 22 and the medium 6. By the electric field thus produced and charges of a latent image formed on the hold layer 7, the reflected light from the mirror 24 is modulated in accordance with the charges and is emitted. Thus, an optical image is reproduced.

As stated above, the head 22 for reproducing an optical image has a predetermined relationship between an applied voltage $V_M$ to the modulation layer 25 and an amount of light rays $I_D$ which have been passed through the analyzer 29 as shown in FIG. 5B or 5C. When the modulation member 25 is made up by a lithium niobate single crystal, it exhibits a voltage-light quantity characteristic as shown in FIG. 5B, whereas when the modulation member 25 is made up by a liquid crystal, it exhibits a characteristic as shown in FIG. 5C. Both in FIGS. 5B and 5C, the abscissa represents an applied voltage $V_M$ to the modulation member 25 and the ordinate represents a light quantity $I_D$ of an emitted light which has been passed through the analyzer 29. In both cases, the waveform varying in a direction of the ordinate indicated by dotted lines represents a change with time of a voltage determined by an amount of charges, and the waveform varying in a direction of the abscissa indicated by dotted lines represents a change with time of an emitted light from the analyzer.

As understood from FIGS. 5B and 5C, since the emitted light from the analyzer 29, having a quantity varying according to an amount of charges (difference in voltage) of the hold layer 25 is such that the minimum value (positive image recording) or maximum value (negative image recording) of the charge distribution of the latent image does not correspond to the black level of the optical information, contrast ratio becomes small even if a video signal which has been subjected to photoelectric transformation is outputted onto a monitor image receiver.

Turning to FIG. 6, there is shown an object readout head 32 of a composite structure of the arrangement of the recording head 3 shown in FIGS. 4A and 4B and that of the reproducing head 22 shown in FIGS. 5A, 5D and 5E. This head 32 is comprised of a photo-to-photo transducer. Components in FIG. 6 indicated by the same reference numerals as those in FIGS. 4A and 5A show equivalent or corresponding components, respectively. As shown, this head 32 is of a stacked structure comprising a transparent electrode 3A (the transparent electrode 26 is also the same or equivalent component) for allowing a light from the object 1 to be transmitted through a lens 2, a photoconductive layer 5, an inductor mirror 24, a photomodulation material layer 24, and an electrode 8. Between the transparent electrode 3A and the electrode 8, a d.c. power supply 9 and a switch 9A for switching a power supply are provided. Since the materials of respective constituent members are the same as those previously described, their detailed explanation will be omitted.

The readout operation of the head 32 differs from that shown in FIG. 5A in that a laser beam $R_L$ for readout is caused to be incident from the electrode 8 side to the inductor mirror 24, thus to read out a latent image obtained by optically modulating an optical image incident from the photoconductive layer 5 by the photomodulation layer 25. Since the correlative characteristic between a quantity $I_A$ of emitted light rays passed through the analyzer 29 and a voltage $V_M$ based on difference of the modulation member 25 is substantially the same as those shown in FIGS. 5B and 5C, the repetitive explanation thereof will be omitted.

Even with the above arrangement, the black level or white level of the object does not correspond to the black level $I_A=0$ (%) of the optical information or the white level $I_A=100$ (%) thereof in the same manner as in the characteristics shown in FIGS. 5B and 5C. As a result, such a black or white level is affected by the characteristic of an optical system like an extinction ratio, the quantity of emitted light rays cannot change over a range from 0 to 100 %. Accordingly, a reproduced pictorial image when outputted onto a monitor receiver, etc. has not a sufficient contrast ratio in the same manner as in the arrangement shown in FIG. 5A.

All conventional charge latent image recording/reproducing systems which have been described with reference to FIGS. 1A to 6 have various problems which will be recited as follows.

(1) In accordance with the recording of a latent image onto the medium 6 which is carried out on the basis of combination of the recording modes (a) to (d) shown in FIGS. 1A to 1D, the polarity of an output signal varies by changes of combination of the recording modes (a) to (d) in recording a series of latent images. For this reason, it is impossible to recognize which one of modes (a) to (d) corresponds to the recording state of a latent image in the medium 6 until that latent image is actually read out from the medium. Accordingly, this resulted in the problem that it is impossible to recognize the polarity of an erase voltage for erasing a latent image recorded in the medium 6 until the latent image is once reproduced and the polarity is confirmed because the polarity of a voltage of the latent image is unknown. Namely, there was the problem that it is troublesome to erase a recorded latent image.

(2) Moreover, in the case of recording a latent image onto the hold layer 7 of the medium 6 by the recording system of the structure shown in FIG. 4A, a dark voltage corresponding to a fogging phenomenon of an optical image is produced. Since such a dark voltage is produced on the basis of the relationship between a surface potential of the charge hold layer 7 and an amount of exposure, it cannot be necessarily said that a surface potential shows an actual amount of exposure with fidelity. For this reason, there was the problem that high fidelity reproduced pictorial image cannot be obtained unless reproduction is conducted in consideration of a dark potential of the surface potential.

(3) When a gap between the photoconductive layer member 5 and the hold layer 7 shown in FIG. 4A is not uniform, a charge latent image held by the medium 6 under this condition will hold charges different from an actual optical image. For this reason, the charge latent image will have a shooting or a contrast error, etc.

Furthermore, also with respect to the reproducing head for readout of latent image shown in FIGS. 5A, 5D and 5E, in the case of reproducing a video signal on the basis of a latent image recorded into the medium under the condition where a gap between the reproducing head 22 and the hold layer 7 is not uniform, an extraordinary phenomenon corresponding to a shooting, or the like occurs in the video signal.

(4) In addition, also with respect to the recording/reproducing head 32 using a photo-to-photo transducer shown in FIG. 6, there was the problem that the black level or white level of an optical image of an object is not completely in correspondence with the black level or white level of a reproduced optical image. For this reason, the problem that a pictorial image having a small contrast ratio is only obtained when a video signal obtained by applying photoelectric transformation to such an optical image is outputted onto a monitor image receiver exists also in the arrangement of FIG. 6.

Namely, since the correspondence between optical information of the block in an optical image of an object and the black level in a video signal obtained by applying photoelectric transformation to the optical image becomes unclear, an original black cannot be recognized as a black in a pictorial image when an image of the object is reproduced on a monitor image receiver on the basis of such a video signal.

SUMMARY OF THE INVENTION

A principal object of this invention is to provide a system for recording/reproducing a charge latent image, which is capable of confirming, on the basis of a reference value detected from a specific monitor region, a recording mode like the polarity of charges of a latent image recorded on the medium or the state of charges like an error in a photoelectric transformation at the time of recording/reproducing.

The first merit of this invention resides in providing a system for recording/reproducing a charge latent image, which is adapted to detect, from the above-mentioned monitor region, the polarity and negative positive state and positive of a recorded charge latent image so that the polarity and a value of a latent image erasing voltage can be determined, thus making it possible to easily erase such a recorded latent image.

The second merit of this invention resides in providing a system for recording/reproducing a charge latent image, which is capable of obtaining, from the above monitor region, a high fidelity reproduced pictorial image by precisely taking into consideration a dark voltage produced on a surface potential of the charge hold layer.

The third merit of this invention resides in providing a system for recording/reproducing a charge latent image, which is constructed to eliminate the fact that a corresponding black level in a video signal is not actually in correspondence with black level optical information in an optical image of an object, thus making it possible to sufficiently maintain a contrast ratio in a reproduced pictorial image of the object on a monitor image receiver.

The fourth merit of this invention resides in providing a system for recording/reproducing a charge latent image, which is capable of the same contrast ratio of a reproduced pictorial picture on a monitor image receiver as in the above-mentioned third merit even with a latent image readout head using a photo-to-photo transducer.

To achieve the above object, a system for recording/reproducing a charge latent image according to this invention comprises a photoconductive layer member on which an object image incident through an optical system is formed, a charge hold layer member for holding a charge latent image corresponding to the object image thus formed, latent image formation means including a pair of electrodes between which the photoconductive layer member and the charge hold layer member are put and for allowing the hold layer to hold charges in dependency upon a light quantity of the image formed, and means for reading out the latent image formed, characterized in that the system comprises shielding means provided between the optical system and the photoconductive layer to shield a portion of an image formation range, an information detection area formed in a portion of a recording region of the hold layer by the shielding member and showing the state where there is no influence of the electromagnetic radio ray information, and means for discriminating the recording state of a charge latent image on the basis of information from the recording region including the detection region.

When the detection region is set in the optical black correspondence portion, information obtained by reading out a charge latent image in the detection region corresponding to the optical black within a blanking interval in a video signal is taken as a reference, thus making it possible to set the black level of the video signal.

As constructed above, in the case of forming an electromagnetic radio ray image on the photoconductive layer to form a charge latent image on the charge hold layer, since a detection region of information showing the state where there is no influence of electromagnetic radio ray information is present within the recording region of the charge hold layer of the charge hold layer, a signal not subject to the influence of electromagnetic radio ray information, which corresponds to charges transformed within the region, is recorded by the recording system.

In the case of reading out the charge latent image recorded as above, information indicating the state where there is no influence of electromagnetic radio ray information is read out from the detection region. Thus, information indicating the recording mode of the charge latent image is obtained on the basis of the above information signal.

Accordingly, the system for recording/reproducing a charge latent image according to this invention is constructed to provide, within a portion of the hold layer recording region for recording a charge latent image on the hold layer, detection region for recording information indicating the state where there is no influence of electromagnetic radio ray region, thus making it possible to read out the information within the detection region in reading out a charge latent image from the medium to reproduce a video signal, or erasing a charge latent image from the medium. Accordingly, the recording mode of a charge latent image recorded on the medium can be easily discriminated on the basis of the readout information within the detection region by using as a reference voltage.

Since the discrimination of the latent image recording mode is easily conducted, even if the system for readout of a charge latent image from the medium is of any structure, a suitable readout operation can be easily carried out. Further, also in the case of erasing a charge latent image recorded on the medium, the recording mode of the latent image can be easily discriminated by the readout of information from the detection region. Thus, the erasing operation can be securely and easily carried out.

In the system constructed to record a charge latent image corresponding to the optical black portion into the detection region in recording it onto the medium, and to read out, within a blanking interval in the video signal, at the time of readout, the charge latent image which has been read out from the detection region to obtain information, thus to set the black level of the video signal by using the information as a reference, there can be generated a video signal in which the black level corresponding to the optical black portion is set. Accordingly, when this video signal is delivered to a monitor image receiver, a clear reproduced pictorial image having a large contrast ratio can be provided on the display.

Furthermore, since a signal adjusted by a signal level or information which serves as a reference can be generated, the relative position between the readout member and the hold layer can be controlled by the reference signal level or information.

In addition, changes such as a shooting or contrast errors which are likely to occur in the case of forming a charge latent image to record it, or in the case of reading out a latent image to reproduce it as an image can be suppressed by setting the black level reference signal.

BRIEF DESCRIPTION OF THE DRAWINGS

In the accompanying drawings:

FIG. 4A is a perspective view showing an example of a conventional charge latent image recording system, FIG. 4B is an enlarged perspective view of the medium used in the system of FIG. 4A, and FIG. 4C is a correlative characteristic diagram between a surface potential and an amount of exposure;

FIG. 5A is a side view showing the arrangement of an example of a conventional charge latent image reproducing system, FIGS. 5B and 5C are characteristic diagrams showing photoelectric transformation characteristics thereof, respectively.

FIG. 9 is a characteristic view collectively showing, as (a) to (d), charge characteristics (of FIGS. 7C(a), 7C(b), 8C(a) and 8C(b)) of a latent image recorded on the hold layer by the recording system according to the first embodiment of this invention, respectively;

FIG. 10 is a schematic diagram showing the relationship between respective voltage characteristics of FIG. 9;

FIG. 13 is a circuit diagram showing an arrangement of a reproducing system according to a first embodiment for reproducing charge latent image recorded by the above recording system;

FIG. 14 is a waveform diagram showing signals on respective portions of the reproducing system shown in FIG. 13;

FIG. 15 is a front view showing a charge latent image of the hold layer in a reproducing system according to a second embodiment of this invention;

FIG. 16 is a characteristic diagram showing waveforms of respective portions in reproducing the charge latent image shown in FIG. 15;

DETAILED DESCRIPTION OF THE PREFERRED EMBODIMENT

Preferred embodiments of a charge latent image recording/reproducing system according to this invention will now be described in detail with reference to the attached drawings.

Figure 1:
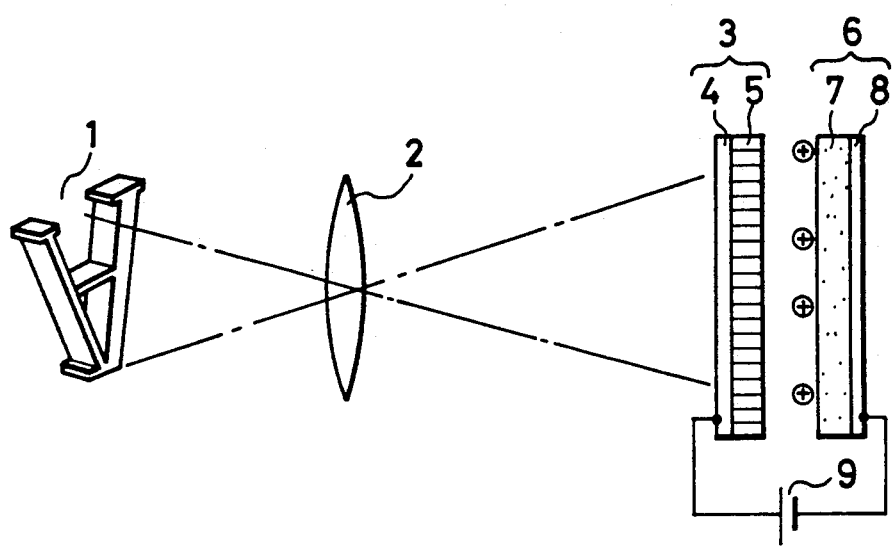
FIGS 1 to 3 are schematic diagrams showing typical four types of conventional charge latent image recording modes, respectively.
Figure 1A:
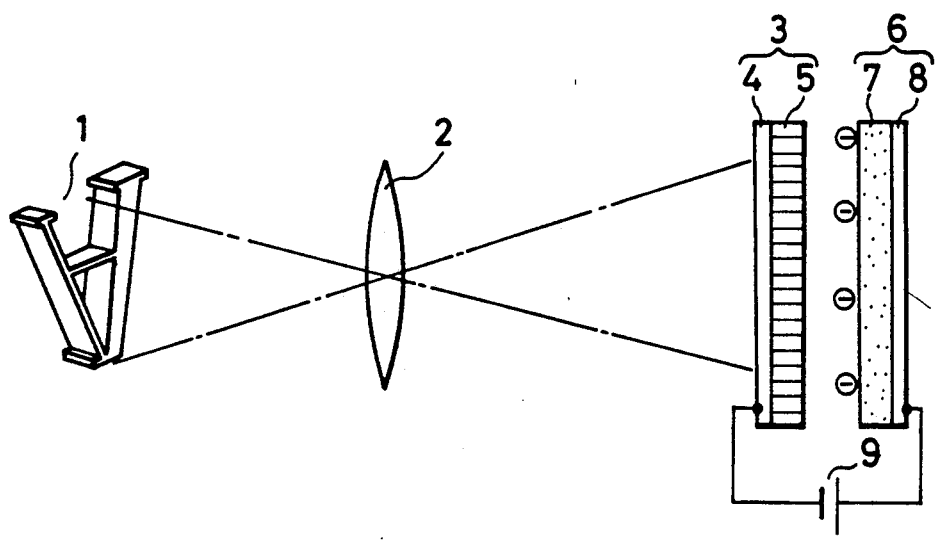
Figure 7:
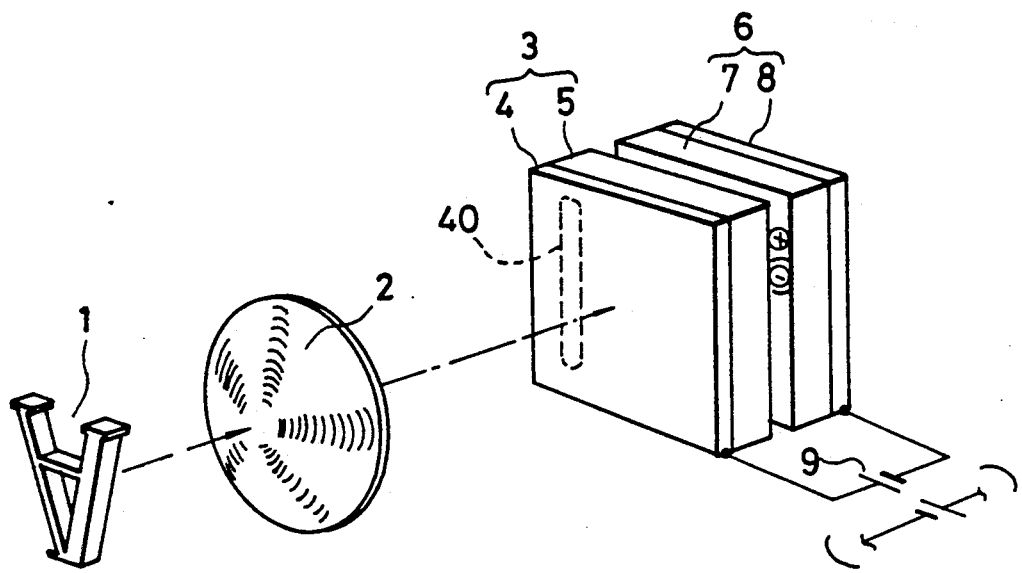
FIG. 7 is a perspective view showing an outline of the arrangement of a charge latent image recording system according to a first embodiment of this invention.

FIG. 7 is a perspective view showing an outline of the arrangement of a charge latent image recording system according to a first embodiment of this invention. In the system shown, there is disclosed an arrangement for recording an image of an object 1 in a form of positive charge positive latent image which has been described with reference to FIG. 1. The same reference numerals as those attached to the components in FIG. 1 show the same or corresponding components, respectively. In this figure, it is assumed that the object 1 is illuminated by an unshown light source resulting the object being brighter than its background, and a transparent electrode 4 constituting a recording head 3 along with a photoconductive layer member 5 includes a light shielding portion 40, e.g., in the form of a belt in a portion of a square entire region, e.g., at a portion along one side thereof. Since this light shielding portion 40 shields a light from the object 1 which has reached the head 3 through an optical lens 2, a detection region 70 (see FIG. 7A or 7B) corresponding to the light shielding portion 40 is formed in the charge hold layer 7 of the recording medium 6. It is to be noted that while the transparent electrode 4 of the recording head 3 is connected to the positive electrode of a d.c. power supply 9 and the electrode 8 of the medium 6 is connected to the negative electrode thereof, if the power supply 9 is connected to both electrodes 4 and 8 with an inverse polarity relationship as parenthesized in FIG. 7, respectively, an image recorded onto the hold layer 7 becomes a negative charge negative latent image as shown in FIG. 7B.

Figure 7A:
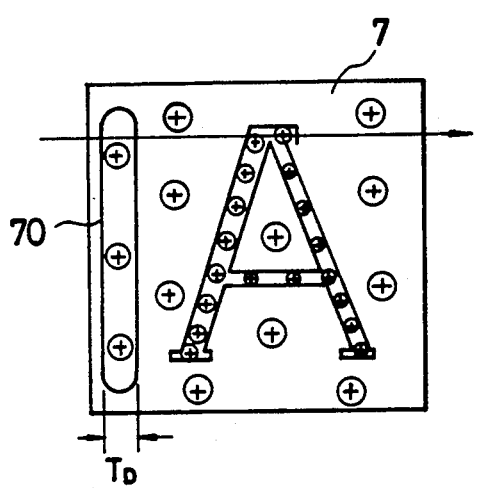
FIG. 7A is a front view showing a positive charge positive latent image by the above arrangement.
Figure 7B:
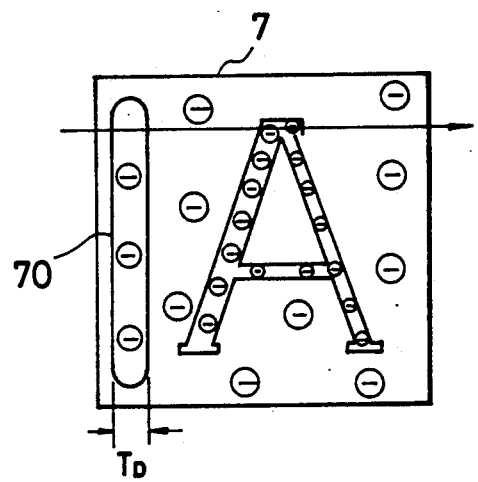
FIG. 7B is a front view showing a negative charge positive latent image, and FIGS. 7(a) and (b) are charge voltage characteristic diagrams corresponding to FIGS. 7A and 7B, respectively.

In the recording system constructed above, where the power supply 9 is connected as shown in FIG. 7, an image of an object 1, i.e., a capital letter A as shown in FIG. 7A is formed in a manner that an amount of positive charges (charge density) at the letter A is higher than that of the background. At this time, a detection region 70 is formed in the portion along the left side of the surface of the hold layer 7. This detection region 70 is formed on a region which is not exposed to the incoming light through the lens 2 due to the light shielding portion 40. Accordingly, any one of four kinds of modes for recording a charge latent image can readily be identified by scanning the recording region as indicated by an arrow in FIG. 7A, and detecting a polarity and an amount of the charges within a detection period $T_D$ corresponding to the detection region 70.

Figure 7C:
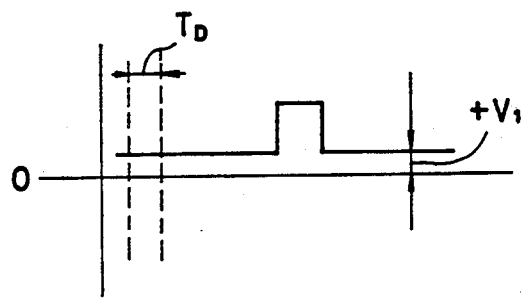
Figure 7D:
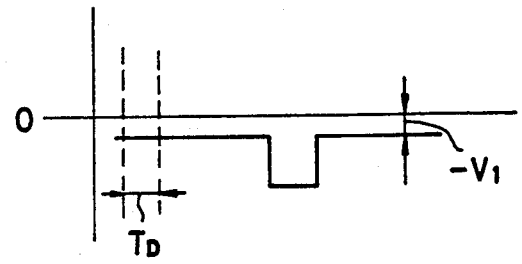

In the arrangement shown in FIG. 7, a portion corresponding to the object 1 (an image of capital letter A) is recorded in the recording mode of a positive charge positive latent image where the density distribution of positive charges is higher than that of the background. At this time, when a voltage value along the arrow in FIG. 7A is detected, the portion corresponding to the recorded image indicates a voltage value raised as shown in contrast to the voltage $+V_1$ of the portion corresponding to the background including the detection region 70 as shown in FIG. 7C(a).

When the transparent electrode 4 on the side of the recording head 3 and the negative electrode of the power supply g are connected and the medium electrode 8 and the positive electrode thereof are connected as indicated by the parentheses in FIG. 7, a charge latent image in the recording mode of a negative charge positive latent image is recorded. Namely, as shown in FIG. 7B, the object corresponded portion (image of the capital letter A) is brought into the state where it has a density distribution of negative charges higher than that of the background corresponded portion. At this time, a voltage value along the arrow in this figure is such that the portion corresponding to the recorded image is high in the negative direction in contrast to the voltage $-V_1$ of the portion corresponding to the background including the detection region 70.

Figure 2:
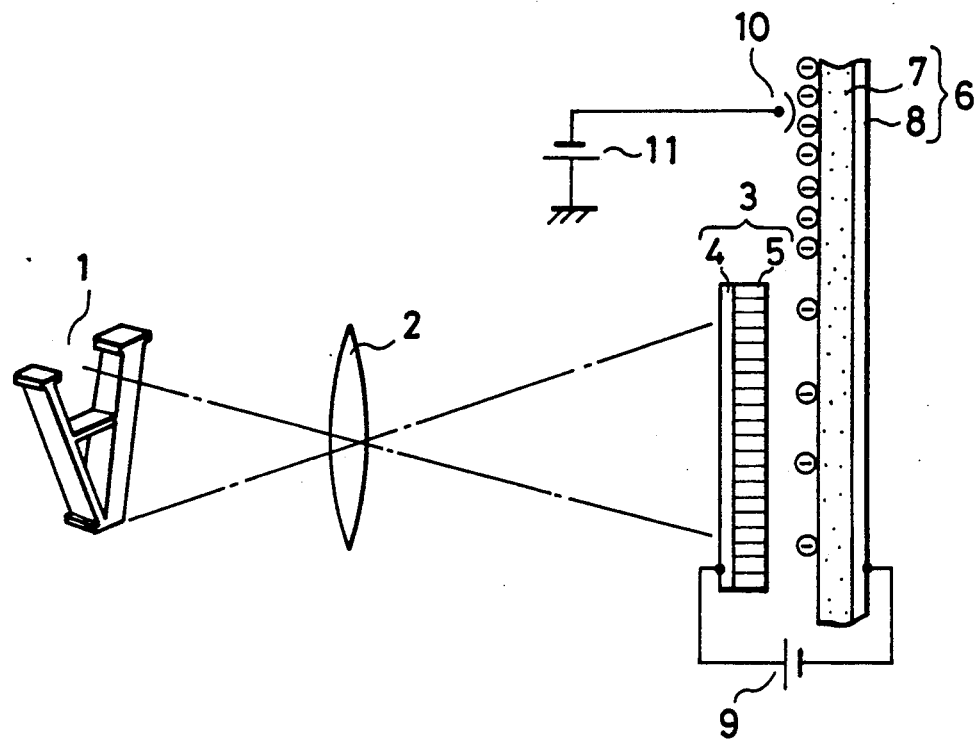
Figure 3:
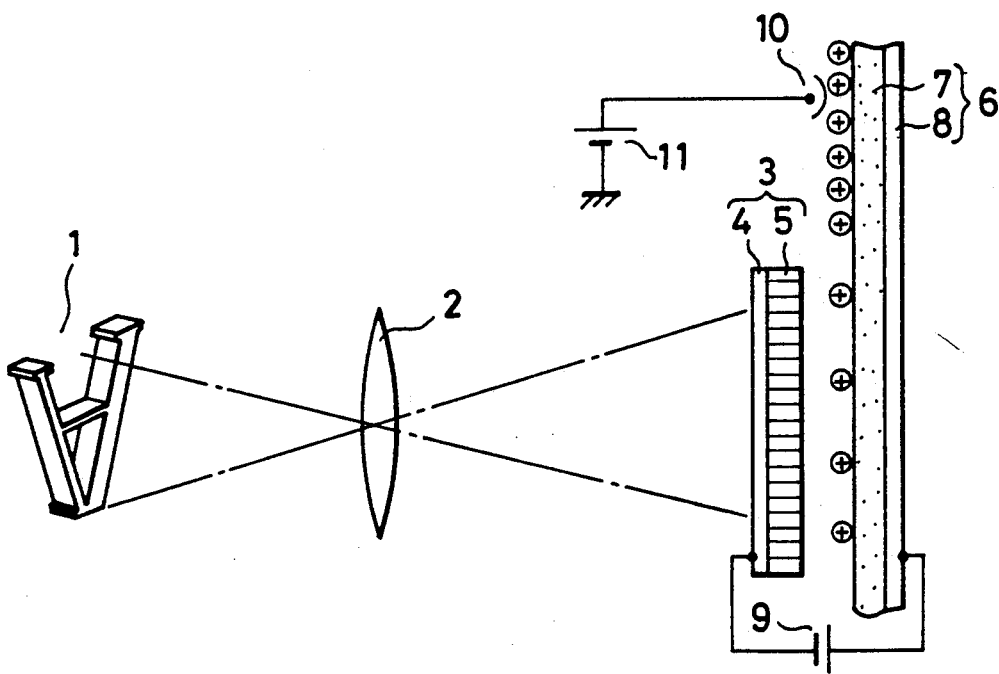
Figure 8:
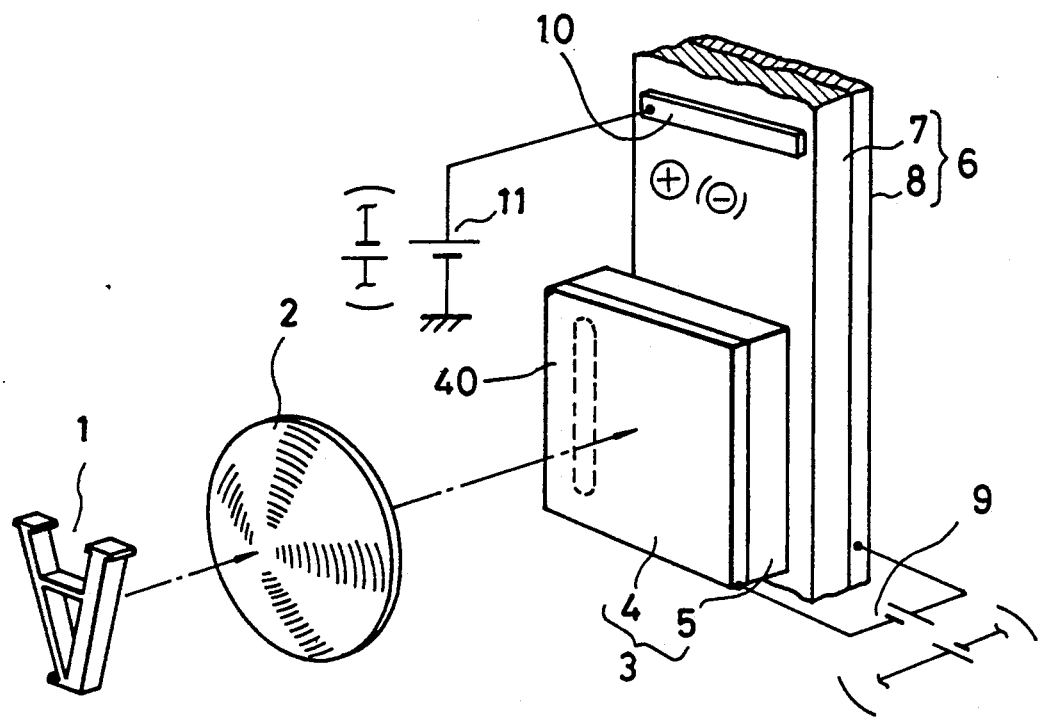
FIG. 8 is a perspective view showing a schematic arrangement provided with a corona charger of the charge latent image recording system according to the first embodiment of this invention.

On the other hand, when the corona charger 10 and the power supply 11 therefor are connected to the hold layer 7 of the medium 6 as shown in FIG. 8 corresponding to the prior arts FIGS. 2 and 3, the object 1 is recorded as a negative latent image.

Figure 8A:
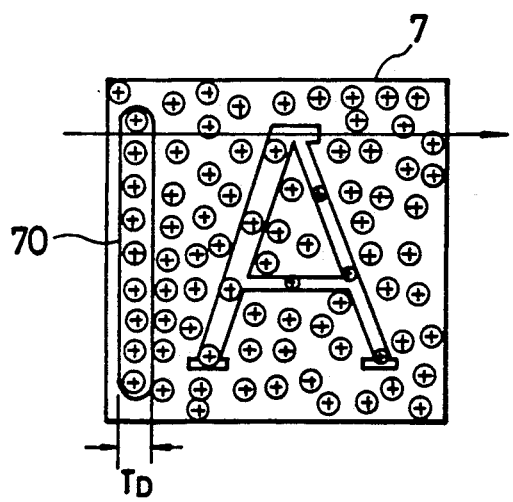
FIG. 8A is a front view showing a positive charge negative latent image of the arrangement of FIG. 8.
Figure 8B:
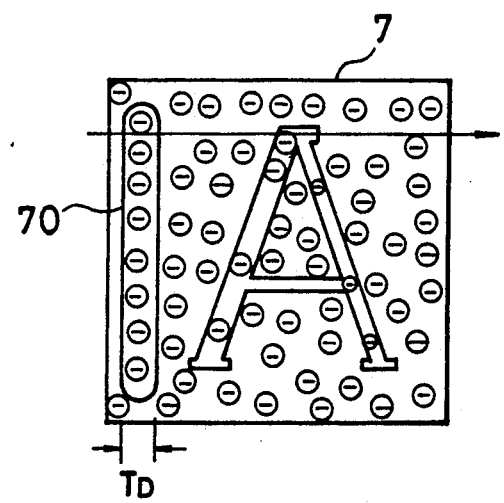
FIG. 8B is a front view showing a negative charge negative latent image of the arrangement of FIG. 8, and FIGS. 7C(a) and (b) are characteristic diagrams of charge voltage corresponding to FIGS. 7A and 7B, respectively.
Figure 8C:
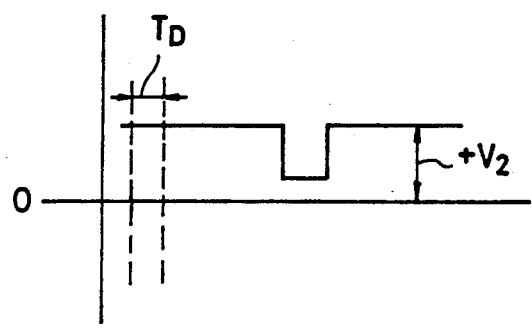
Figure 8D:
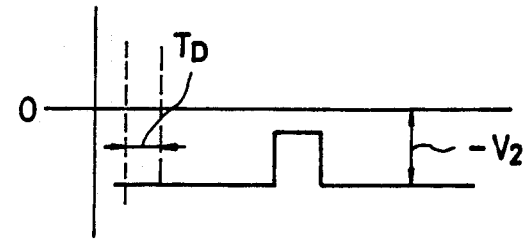

Initially, as shown in the main arrangement of FIG. 8, the negative electrode of the power supply 9 is connected to the transparent electrode 4, the medium electrode 8 is connected to the positive electrode of the power supply 9, and the corona charger 10 connected to the positive electrode of the power supply 11 is connected to the hold layer 7 (corresponding to the prior art of FIG. 3). The object image A in this arrangement is, as shown in FIG. 8A, such that the portion excluding the recorded image on the hold layer 7 has a high density distribution of positive charges, whereas the portion corresponding to the recorded image has a low density distribution of positive charges. Namely, a voltage value of the portion along the arrow in FIG. 8A appears, as shown in FIG. 8C(a), in a manner that the portion corresponding to the recorded image has a voltage value lower than the voltage value $+V_2$ of the portion corresponding to the background.

In the arrangement of FIG. 8, when the connection of the positive and negative electrodes of the power supplies 9 and 11 is made with a polarity opposite to the above as indicated in the parentheses, the object 1 (i.e., capital letter A) is recorded as a negative charge negative latent image. The charge latent image recorded in this recording mode is as shown in FIG. 8B, and a charge voltage value along the arrow in the figure is, as shown in FIG. 8C(b), such that the portion corresponding to the recorded image has a low density distribution of negative charges while the portion corresponding to the background has a high density distribution of negative charges.

A reproducing system according to a first embodiment adapted to read out charge latent images recorded in the respective recording modes explained with the aforementioned various examples of arrangement according to the first embodiment and having voltage characteristics respectively shown in FIGS. 7C(a), 7C(b), 8C(a) and 8C(b) will now be described.

Initially, the basic concept of the reproducing system according to the first embodiment will be described. This reproducing system is operative to read out the polarity of charges and an amount of charges within the detection region 70 in the hold layer 7 provided for recording charge latent images. Since the detection region 70 is not exposed to incoming light through the lens 2 even in the case where recording is conducted in any one of four recording modes, identifying the used recording mode is possible by reading out the polarity and amount of the charges in this region and the background. Namely, the readout result inclusive of voltage values $+V_1$, $-V_1$, $+V_2$ or $-V_2$ of the region 70 will be one of the patterns shown in FIGS. 9(a) to 9(d) depending on the used recording mode. FIG. 10 shows a readout voltage Vc output from a reading head when the reading head reads the region 70, and a potential relation of the voltage values $+V_1$, $-V_1$, $+V_2$ and $-V_2$ in a vertical scale, where a positive reference voltage Vt selected to be between $+V_1$ and $+V_2$, and a negative reference voltage $-V_t$ selected to be between $-V_1$ and $-V_2$ are indicated.

A value of the readout voltage Vc is discriminated by a multi-level discriminator 53 shown in FIG. 13 and is classified thereby into one of four output values 0, 1, 2 and 3 as indicated in a circuit arrangement of FIG. 13.

Figure 11:
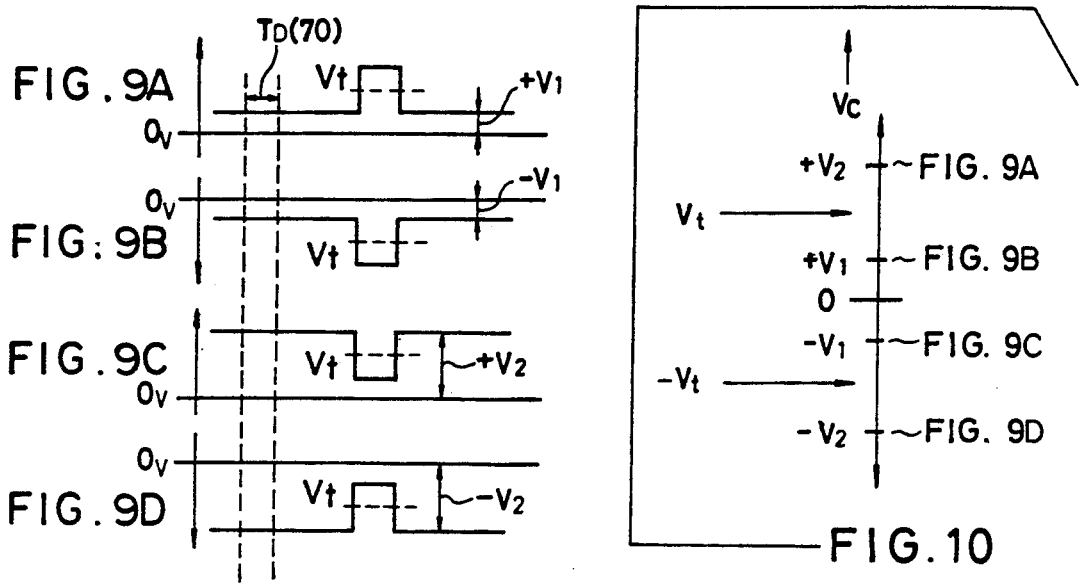
FIG. 11 is a Table collectively showing the correspondence between characteristics of charge voltages and recording modes.
Figure 12:
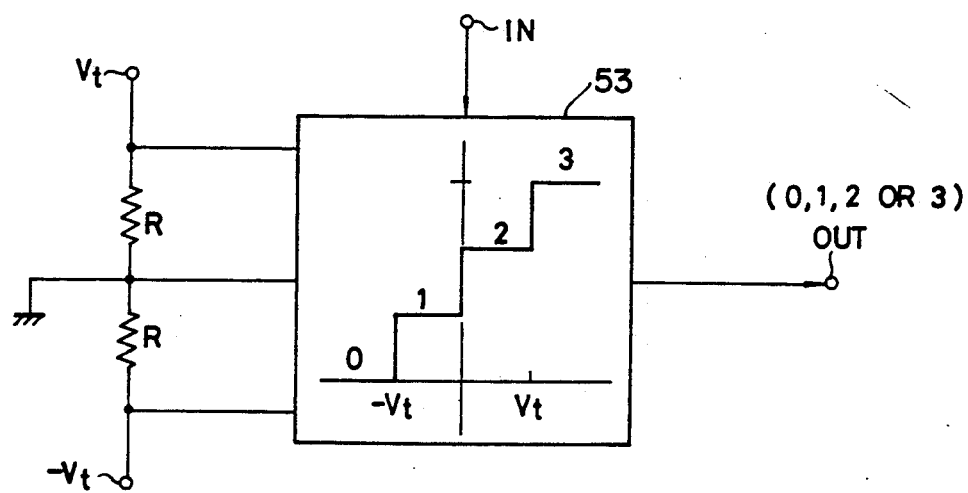
FIG. 12 is a circuit diagram of a reproducing system showing a multi-value gate as recording mode discrimination means in accordance with an example of correspondence shown in the intermediate column of FIG. 11 and its peripheral configuration.

From the patterns shown in FIG. 9(a) to 9(d) and the voltage relation shown in FIG. 10, a table shown in FIG. 11 is obtained. Thus, any one of the four recording modes is identified from the table when the readout voltage Vc is discriminated to one of the four classified values.

The reproducing system 50 according to the first embodiment comprises, as shown in FIG. 13, a reproducing head 51 for reading out charges of a latent image recorded on the medium 7 by, e.g., an electrostatic detection method, etc., a sample-hold circuit 52 for performing a sample-hold of a voltage signal read out by the reproducing head 51, the multi-level discriminator 53 for discriminating the readout signal in the detection region 70 after being subjected to sample-hold by a sample-hold circuit 52 according to the aforementioned operation, a control circuit 54 for outputting a control signal on the basis of an output from the discriminator 53, an amplifier 55 for amplifying an output from the head 51 to output signals of positive and negative potentials, respectively, and a switch 56 for outputting through a terminal 57 selecting either of the amplified positive/negative potential signals on the basis of the control signal.

As understood from the above description, the operation of this reproducing system 50 is such that, in the case of carrying out reproduction of a latent image recorded in the recording mode of a positive charge negative latent image, e.g , as shown in FIG. 9(c) respective signal waveforms as shown in FIGS. 14(a) to 14(c) are delivered at corresponding portions in FIG. 13, whereby the kind of latent image is discriminated. Thus, reproducing operation is conducted.

The detection region 70 which is not subject to the incoming light hold the voltage value of detection periods $T_D$ shown in FIGS. 7C, 8C and 9 as a result of scanning on the hold layer indicated by arrows of FIGS. 7A, 7B, 8A and 8B. Accordingly, when the scanning result of waveforms shown in FIG. 14(a) is obtained, a voltage value $+V_2$ of the detection petriod $T_D$ higher than a positive reference voltage Vt is detected, so it is discriminated by the multi-level discriminator 53 that this latent image is recorded in the recording mode of a positive charge negative latent image. In this embodiment, a detection voltage value within this period $T_D$ is subjected to sampling by the sample-hold circuit 52. To carry out this sampling, a sampling clock signal CLK shown in FIG. 13 is delivered to the circuit 52. In the case of the above-mentioned positive charge negative latent image, the circuit 52 is supplied with a detection signal shown in FIG. 14(a) and the clock signal CLK shown in FIG. 14(b) to send an output signal having a waveform shown in FIG. 14(c) to the discriminator 53.

The discriminator 53 discriminates the input signal and outputs one of the classified values 0 to 3 as described before. In the above case, it is readily discriminated that the input signal is classified to the value 3 from the table shown in FIG. 11. Thus the recorded latent image is judged to be positive charge negative latent image.

An output signal from the discriminator 53 is delivered to a control circuit 54 shown in FIG. 13. The control circuit 54 is comprised of, e.g., an arithmetic logic unit (ALU) and is operative to output a switching control signal to a switch 56. Two signals having polarities different from each other, which are amplified by the amplifier 55, are delivered to the switch 56. When the control signal is delivered from the control circuit 54, the switch 56 effects switching to select either of the two signals. Since the latent image which has been read out is a positive charge negative latent image in the case of the above explained recording mode, the contact shifts to the negative side of the amplifier 55 in FIG. 13.

As it is natural that a recorded latent image is displayed on a display screen as a positive image for higher fidelity, picture reproduction such as image polarity reversal is conducted so that the object is represented as a positive image in the case of the classified values 1 and 3 in the table of FIG. 11. Namely, in the case of the positive charge negative latent image and the negative charge positive latent image, the potential of the highliqht of the image is lower than that of the background, the readout signal from the latent image is inversed so that a positive image is always displayed on the monitor screen.

In accordance with the above-described operation, a video signal for reproduction is outputted from the output terminal 57 so that an optimum reproduced image is obtained.

The charge latent image recording/reproducing system according to this invention is characterized in that a recording condition is registered on a specific detection region provided on the recording surface of the medium at the time of recording, and when in carrying out reproduction by detecting, the polarity and amount of charges held in the specific region, the charge polarity and the used recording mode of the recorded latent image is identified, thus to control the output video signal for reproduction. In the above-described recording/reproducing system of the first embodiment, the detection region is so provided that it is not exposed to the incoming light.

However, this invention is not limited to the arrangement and the operation as disclosed in the above-mentioned first embodiment. However, this invention may employ arrangements and operations of a latent image recording/reproducing system according to the second and third embodiments designed to set a charge level o the detection region to black (dark) or white (bright) level of the optical information, which will be described hereinafter.

The recording system for the second embodiment has the same structure as the recording system of the first embodiment shown in FIG. 7. It should be noted that a light shielding enclosure, not shown, may be provided around the recording head 3 in order that an unnecessary external light is not incident to the photoconductive layer 5. Furthermore, since materials of the transparent electrode 4, the photoconductive layer 5, and the hold layer 7 of the medium are those which have been described in connection with the prior art and the first embodiment, respectively, the repetitive description will be omitted.

As an alternative to providing the light shielding portion 40 for causing the direction region 70 on the hold layer 7, a specific level of charge may be given to the detection region 70 by an electrode, not shown, for the purpose provided to contact a surface of the hold layer 7.

The charge latent image recorded above includes, as shown in FIG. 15, detection region 70 having such a charge level corresponding to an optically black or dark level of the image of the object. Reference numeral 71 denotes a charge latent image formed in correspondence with the shape of an object.

The reproducing principle will be initially described for explanation of the system for reproducing a recorded charge latent image shown in FIG. 15. In the reproducing system of the second embodiment, attention is drawn to the fact that a reproduced pictorial image in the conventional reproducing system which has been described with reference to FIGS. 5A to 5E obtains only a small contrast ratio, thus to carry out a signal processing described hereinafter in order to eliminate such a problem.

Figure 5D:
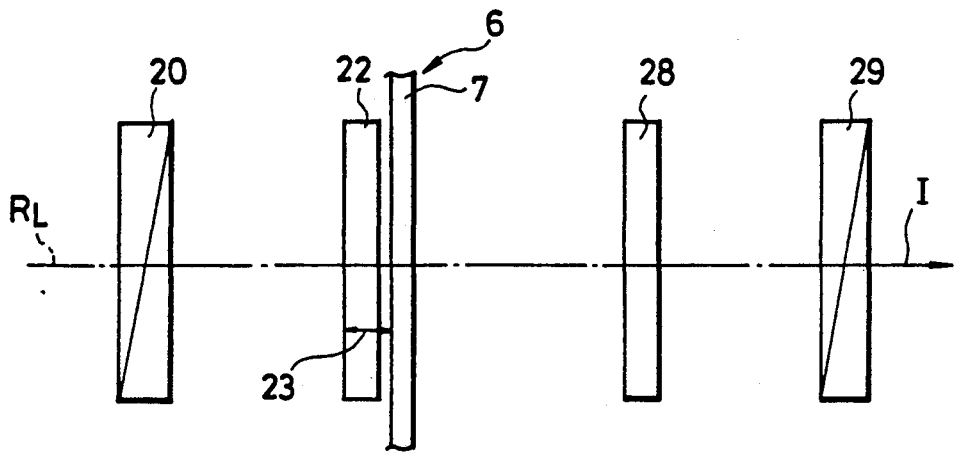
FIGS. 5D and 5E are arrangement diagrams showing the conventional arrangement of a reproducing system of the transmission type and the arrangement of a reproducing system of the reflection type, respectively.
Figure 5E:
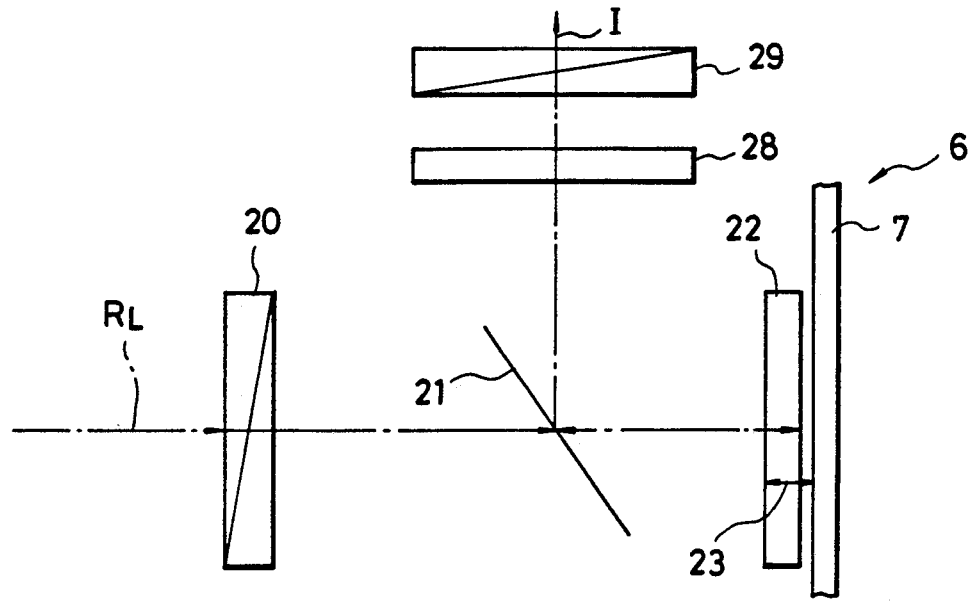

In the case of a charge latent image which has been read out by the reproducing system as shown in FIGS. 5A, 5D and 5E, a beam of light is generated of which an intensity distribution in a section of the beam is varied in correspondence with a charge distribution of the charge latent image. Such beam of light may be subject to a photoelectric transformation. As such a photoelectric transformation is a known technology, no detailed explanation is given here. By being subjected to photoelectric transformation, a video signal $S_1$ of the charge latent image is as shown in FIG. 16($a$) is obtained. The readout period of this video signal $S_1$ consists of a blanking period or interval and an image period as shown in FIG. 16($a$). Accordingly, by reading a voltage $V_1$ or $V_2$ within the blanking period, a correlation between the optical black level and the black level of the video signal $S_1$ is obtained to be established as a reference.

An actual configuration of a black level setting circuit in the reproducing system of the second embodiment based on the principle to set the black level of the video signal as mentioned above will now be described with reference to FIGS. 17 and 18.

Figure 17:
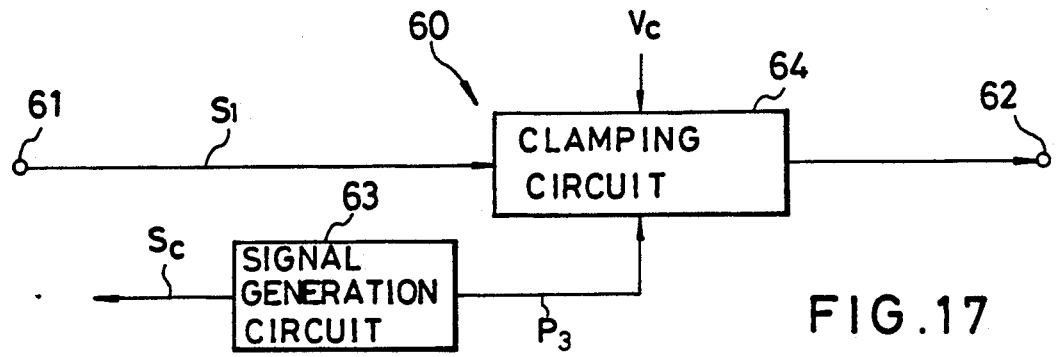
FIG. 17 is a block diagram showing a black level setting circuit in the reproducing system of the second embodiment.

In FIG. 17, the black level setting circuit 60 comprises an input terminal 61 for inputting the video signal $S_1$, an output terminal 62 for outputting a video signal in which the black level is set, a signal generation circuit 63 for generating a clamp pulse $P_3$ shown in FIG. 16($d$), and a clamping circuit 64 for setting the black level in the video signal by setting the video signal $S_1$ delivered from the terminal 61 to a voltage Vc by the clamp pulse $P_3$ delivered from the circuit 63. The signal Sc outputted from the circuit 63 is a timing signal or a control signal used for control of other components of this reproducing system.

In accordance with the circuit configuration of FIG. 17, the black level corresponding to the optical black level is set at a level of the voltage $V_2$ as shown in FIGS. 16($a$) and ($d$). Thus, e.g., a video signal for reconstructing an object image to be white is outputted from the terminal 62.

The circuit configuration of a black level setting circuit 65 shown in FIG. 18 will now be described. In the figure, the circuit 65 comprises a signal generation circuit 66 for generating the signal Sc and a sampling pulse $P_1$ as shown in FIG. 16($b$), a sample-hold circuit 67 for sampling the video signal $S_1$ or the basis of the sampling pulse $P_1$ to generate a sampling signal $P_2$ as shown in FIG. 16($c$), a black level generation circuit 68 for generating a subtraction signal by the signal $P_2$, and a subtracter 69 for subtracting, from the video signal $S_1$, a subtraction signal generated by the circuit 68.

As stated above, a scheme is employed in the reproducing system to set a black level of signal corresponding to the optical black level to thereby implement a correction thereto, thus making it possible to reproduce an image which is accurate in contrast on the display screen of the monitor.

It is to be noted that instead of establishing the black level correlation, a white level of signal corresponding to an optical white level can be obtained for another improved example.

Although illustrative explanation is not given, the third embodiment employs a recording system constructed to irradiate a white light (high intensity light) into the detection region in place of the light shielding pattern mentioned previously, thus to obtain an optical white level reference to be correlated to a white peak level of the reproduced video signal.

In a reproducing system of the third embodiment for such arrangement, the circuit configuration of the second embodiment may easily be modified to clamp a white peak of the video signal instead of the black level thereof.

It is to be noted that, for giving charges corresponding to the white level into the detection region at the time of recording, same method using an electrode for the purpose contacting the hold layer 7 as mentioned before, can be employed.

In this invention, not only the aforementioned black or white level but also a level of other specific color(s), e.g. R, G or B of the background may be set for the level of charges to be recorded for reference.

Figure 18:
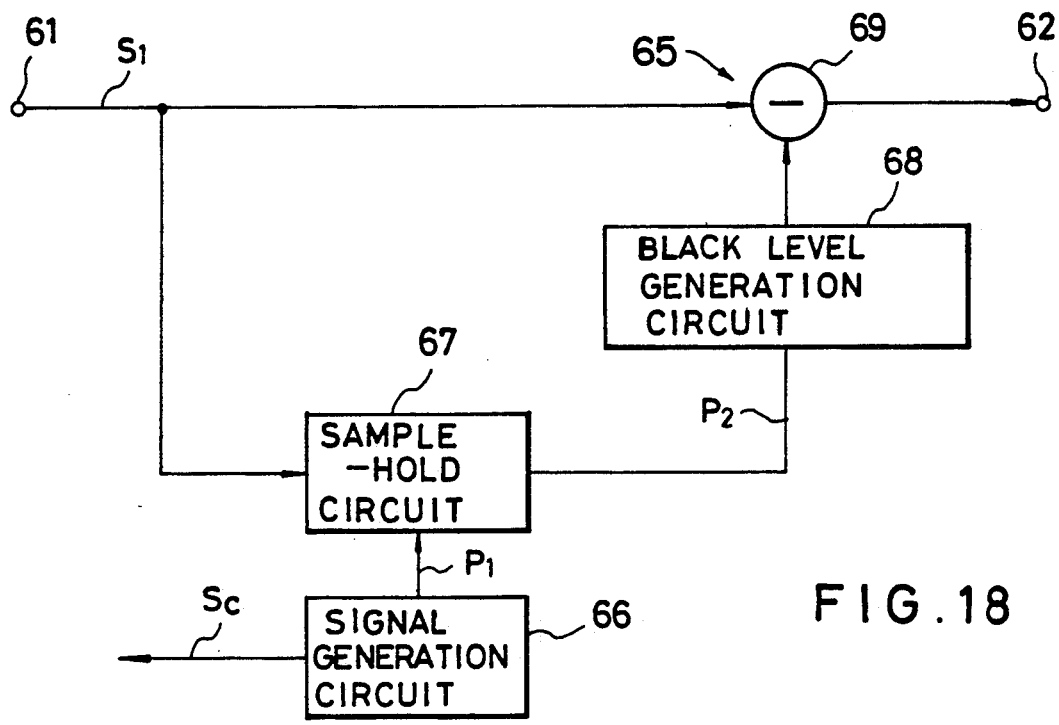
FIGS. 18 and 19 are block diagrams showing a modification of the configuration of the black level setting circuit in the second embodiment.

While it has been described in FIG. 18 that sampling signal $P_2$ is delivered to the black level generation circuit 68 to provide a subtraction signal, thus to set the level of the video signal $S_1$ by the subtracter 69, an approach may be employed to provide an automatic gain control (AGC) circuit in place of the circuit 68 and the subtracter 69 to obtain an accurately level clamped video signal outputted from the AGC circuit. In accordance with a reproduced image thus obtained with the AGC circuit, it is possible to suppress a shading effect or contrast error, etc. unwillingly generated at the time of forming a charge latent image.

Figure 19:
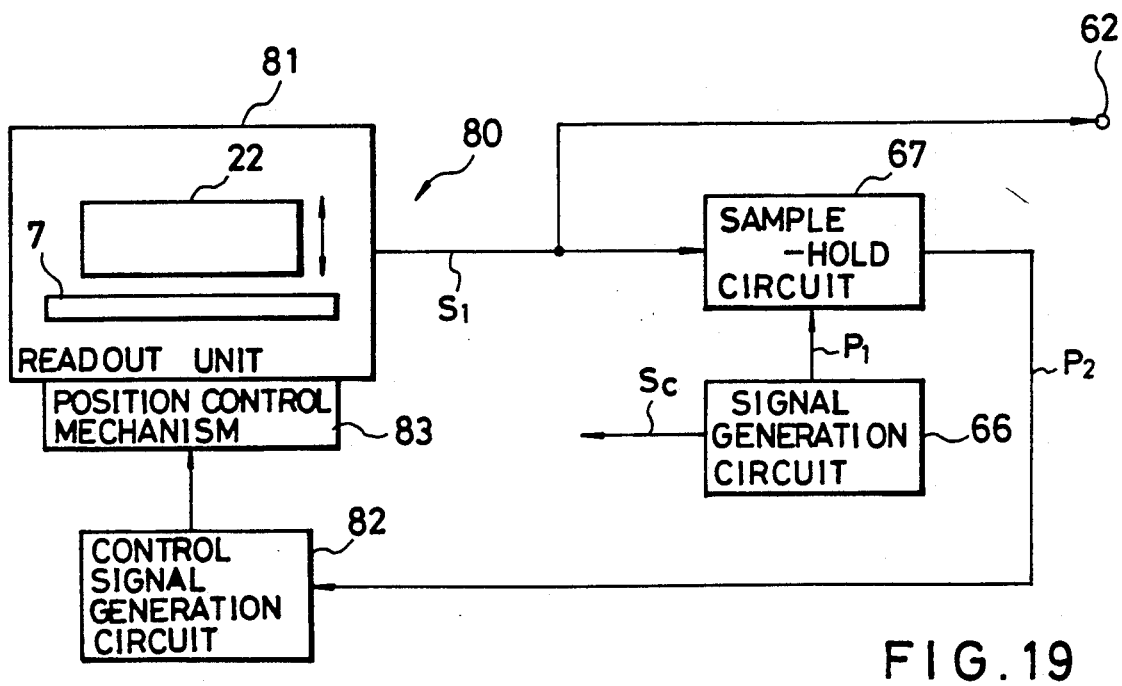

Furthermore, an approach may be employed in the reproducing system to apply a level setter 80 shown in FIG. 19 thereto, thus to adjust a position of a readout unit 81 at the time of reproducing a charge latent image from the medium. In FIG. 19, the same reference numerals as those in FIG. 18 denote the same or corresponding components, respectively, and the readout unit 81 consists of the reproducing head 22 and the charge hold layer 7. A sampling signal $P_2$ of the sample-hold circuit 67 is delivered to a control signal generation circuit 82. In this circuit, a control signal is generated. The control signal thus generated is outputted to a position control mechanism 83 to drive the readout unit 81. By this control signal, the control mechanism adjusts a relative distance between the head 22 and the hold layer 7 to control the video signal $S_1$ so that a more clear reproduced image can be obtained. It is to be noted that a positional control of the level setter 80 is conducted to make a fine positional adjustment of the head 22 as indicated by an arrow in the figure to increase the distance when the reference signal level is large and to decrease the distance when it is small.

Furthermore, this invention is carried out by the system for recording/reproducing a charge latent image based on the photoelectric transformation system all in the above-described embodiments, but this is not limited to such an implementation. In addition, the basic principle of this invention to form a detection region in the hold layer in the same manner as in the above-described embodiment to discriminate the polarity of charges of a latent image and the recording mode can be also applied to the recording/reproducing system of the photo-to-photo transducer such as disclosed in the U.S. Pat. No. 4,831,452 granted to the applicant to the present invention.

Figure 6:
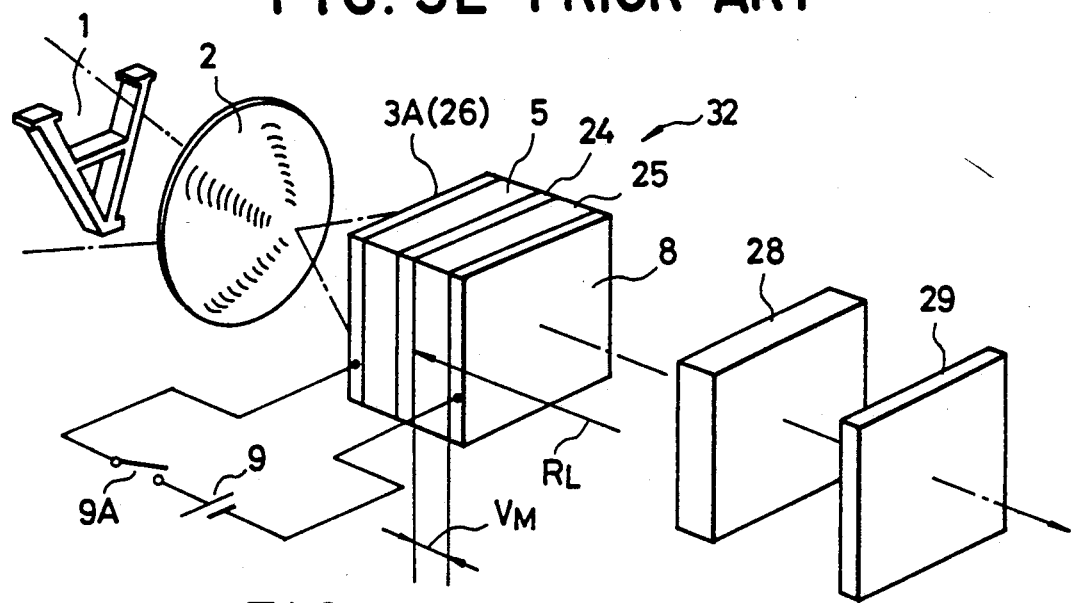
FIG. 6 is a perspective view showing another arrangement of a conventional charge latent image reproducing system.
Figure 20A:
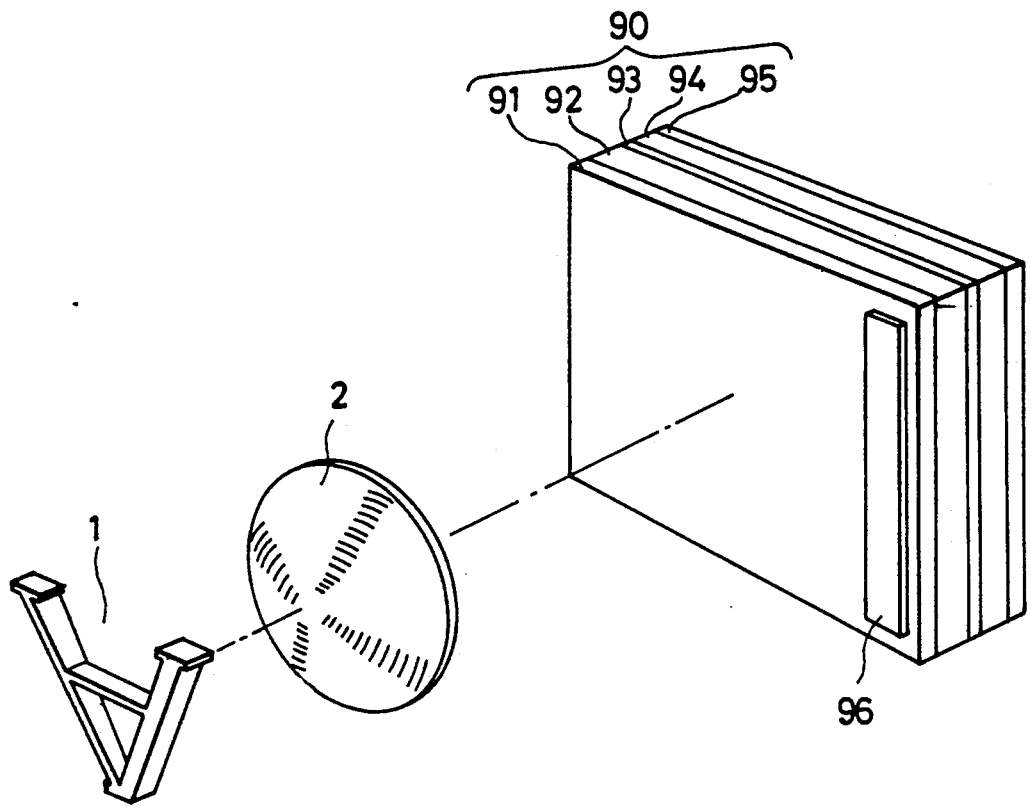
FIGS. 20A to 20C are a perspective view showing a recording system according to a third embodiment of this invention using a photo-to-photo transducer, and side cross sectional views of the different configuration thereof, respectively.
Figure 20B:
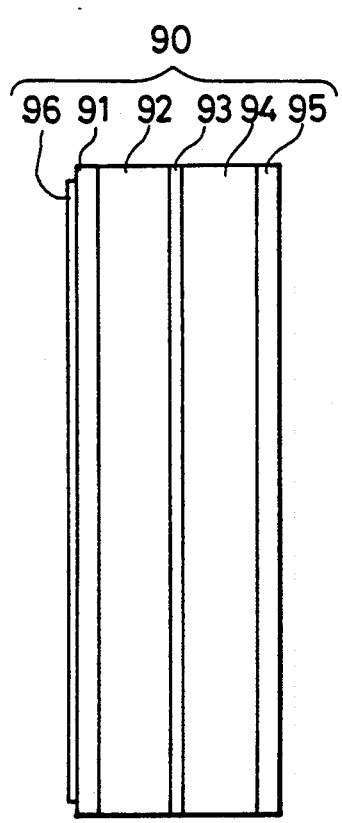
Figure 20C:
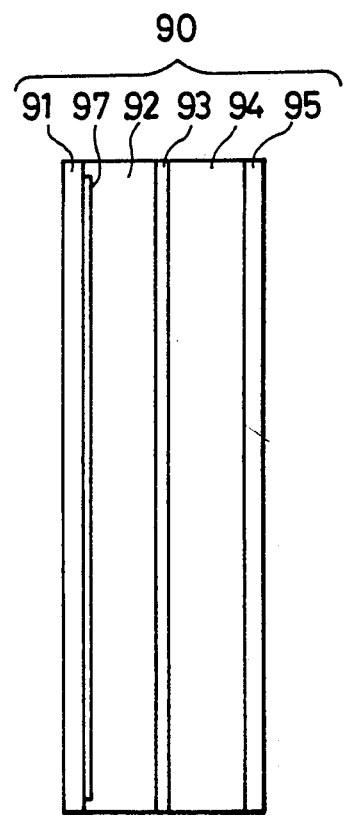

A charge latent image recording/reproducing system of the photo-to-photo transformation type is shown in FIGS. 20A to 20C as the fourth embodiment of the present invention. In these figures, a photo-to-photo transducer 90 comprises a transparent electrode 91 consisting of, e.g., the ITO (indium-tin oxide) material toward which an image of the object 1 is projected through the optical system 2, a photoconductive layer member 92 for generating a high resolution electric field strength distribution, a dielectric mirror 93, a photomodulation material layer 94, and an electrode 95 connected to the transparent electrode 91 through a switch and a power supply which are not shown. The photo-to-photo transducer 90 has an arrangement which is not basically different from that of the conventional photo-to-photo transducer 32 which has been described with reference to FIG. 6. This transducer 90 of the fourth embodiment only differs from the transducer 32, in a light shielding pattern 96 provided along one side surface of the transparent electrode 91 as shown in FIGS. 20A and 20B. This light shielding pattern 96 serves to interrupt an optical path from the object 1 to cause a corresponding unexposed portion in the photoconductive layer 92 thus to generate a reference potential corresponding to the optical black of the image. This portion serves as a detection region in the fourth embodiment.

The means for forming the detection region in the photoconductive layer 92 is not limited to the light shielding pattern 96 provided on the above surface, but a light shielding pattern 97 provided between the transparent electrode 91 and the photoconductive layer 92 as shown in FIG. 20C may be used for this purpose.

In addition to the aforementioned light shielding patterns 96 and 97, an exclusive electrode for forming the region having a potential level corresponding to the optical black may be provided on one side of the photoconductive layer 92.

Since the operation for recording a charge latent image of the object 1 using the photo-to-photo transducer 90 constructed above is carried out in the same manner as in the first to third embodiments, repetitive explanation related thereto will be omitted. The key teaching is that a reference signal is read out within a blanking period of a video signal on the basis of optical information delivered to the photoconductive layer 92 through the light shielding pattern 96 or 97 corresponding to the optical black, whereby a contrast of a reproduced image is improved so that it is reproduced closely to the original contrast of the object 1.

While it has been described also in the above-mentioned fourth embodiment that a charge level set in the detection region corresponds to the optical black, a charge level corresponding to the optical white may be set in the detection region as in the aforementioned third embodiment.

It should be emphasized that when the charge latent image is recorded in accordance with the present invention and is reproduced by any of known reproducing systems, the correlation between the optical black or white level and the corresponding reference level of the reproduced video signal can be accurately established provided that the detection region is reproduced together with the intended charge latent image.

Furthermore, the light referred to in this invention may be any kind of electro-magnetic radio wave applicable to form the charge latent image.

I claim:

1. A recording/reproducing system for recording and/or reproducing a charge latent image onto/from a recording medium, comprising an optical system for directing along a path of an electromagnetic radio ray from an object toward said medium, and recording means disposed in the path for generating said charge latent image in said medium in response to the electromagnetic radio ray from the object, said recording means comprising charge causing means for detection an uniform charge in a detection region of the recording medium, said uniform charge in a detection region corresponding to a reference intensity of the object.

2. A recording/reproducing system as set forth in claim 1, in which said detection region is provided to a specific position of the recording medium, which corresponds to a position of said charge causing means.

3. A recording/reproducing system as set forth in claim 1, in which said recording means comprise two electrodes connected so that a predetermined voltage is applied thereto, a photoconductive layer member disposed between said electrodes and adapted so that an electromagnetic radio ray image is formed thereon, a charge hold layer member disposed between said electrodes to hold charges in correspondence with said electromagnetic radio ray image to thereby record said charge latent image thereon, and readout means for reading charges recorded on said hold layer in order to obtain a reproduced image to thereby read out said charge latent image.

4. A recording/reproducing system as set forth in claim 3, in which said charge causing means comprises a blocking means disposed in the path for blocking a part of said electromagnetic radio ray from said object thereby said detection region being provided on the charge hold layer member, it is not exposed to electromagnetic radio rays from said object, and said system further comprising a discrimination means for discriminating a recording mode used for recording said charge latent image by said recording means with respect to charged potentials of said charge latent image and a background thereof, respectively.

5. A recording/reproducing system as set forth in claim 4, wherein said discrimination means discriminates as said recording mode, a polarity of charges held in said charge hold layer member.

6. A recording/reproducing system as set forth in claim 5, wherein said discrimination means further discriminates as said recording mode, a polarity of said charge latent image with respect to a constant charge density between said charge latent image and said background.

7. A recording/reproducing system as set forth in claim 3, wherein said readout means comprises video signal producing means for producing a video signal from said charge latent image, said readout means including a black level video signal by reading the uniform charge in said detection region, so that said black level video signal produced by the video signal producing means is correlated correspondingly with an optically black portion of said object.

8. A recording/reproducing system as set forth in claim 7, wherein the readout means reads the level of charge in the detection region of said hold layer within a blanking period of said video signal.

9. A recording/reproducing system as set forth in claim 2, wherein said recording medium comprises a charge hold layer on which said charge latent image is formed, and said specific portion is located along a rim of said charge hold layer.

10. A recording/reproducing system as set forth in claim 3, wherein said readout means comprises video signal producing means for producing a video signal from said charge latent image, said readout means including a reference level setting means for setting a reference level of the video signal by reading a level of charge in said detection region, and said reference intensity of the object representing a reference intensity of the object representing a reference intensity of one of red, green and blue parts of the object so that said reference level of the video signal is correlated correspondingly with the reference intensity of one of the red, green and blue parts of the object.

11. A recording/reproducing system as set forth in claim 1, in which said charge causing means comprises means for generating a reference potential, and electrode means connected to the generating means and contacting the detection region of the recording medium, thereby uniformly charging said detection region with said reference potential.

12. A recording/reproducing system as set forth in claim 1, in which said charge causing means comprises white light projecting means for irradiating the detection region so that an optical white reference level of the object is correlated with a white peak level of a video signal reproduced by said system.

* * * * *